United States Patent
Westmoreland et al.

(10) Patent No.: US 9,534,787 B2
(45) Date of Patent: Jan. 3, 2017

(54) MICROMIXING CAP ASSEMBLY (71) Applicant: General Electric Company, Schenectady, NY (US)

(72) Inventors: James Harold Westmoreland, Greer, SC (US); Gregory Allen Boardman, Greer, SC (US); Patrick Benedict Melton, Horse Shoe, NC (US)

(73) Assignee: General Electric Company, Schenectady, NY (US)

( * ) Notice: Subject to any disclaimer, the term of this patent is extended or adjusted under 35 U.S.C. 154(b) by 742 days.

(21) Appl. No.: 13/797,925

(22) Filed: Mar. 12, 2013

(65) Prior Publication Data
US 2014/0260268 A1    Sep. 18, 2014

(51) Int. Cl.
F23R 3/28    (2006.01)
F23R 3/10    (2006.01)

(52) U.S. Cl.
CPC .................. *F23R 3/286* (2013.01); *F23R 3/10* (2013.01); *Y02T 50/675* (2013.01)

(58) Field of Classification Search
CPC ............. F23R 3/283; F23R 3/286; F23R 3/10; F23R 3/14; F23R 3/34; F23R 3/28; F23R 3/12; F23D 1/00–1/06
See application file for complete search history.

(56) References Cited

U.S. PATENT DOCUMENTS

| | | |
|---|---|---|
| 1,855,165 A | 4/1932 | Barker |
| 2,564,042 A | 8/1951 | Walker |
| 3,581,492 A | 6/1971 | Norgren et al. |
| 3,751,911 A | 8/1973 | De Tartaglia |
| 4,100,733 A | 7/1978 | Striebel et al. |
| 4,408,461 A | 10/1983 | Bruhwiler et al. |
| 4,587,809 A | 5/1986 | Ohmori et al. |
| 4,763,481 A * | 8/1988 | Cannon .................. F23D 11/12 60/737 |
| 4,796,429 A | 1/1989 | Verdouw |
| 5,121,597 A | 6/1992 | Urushidani et al. |
| 5,161,366 A | 11/1992 | Beebe |
| 5,235,814 A | 8/1993 | Leonard |
| 5,274,991 A | 1/1994 | Fitts |
| 5,361,586 A | 11/1994 | McWhirter et al. |
| 5,410,884 A | 5/1995 | Fukue et al. |
| 5,415,000 A | 5/1995 | Mumford et al. |

(Continued)

OTHER PUBLICATIONS

U.S. Appl. No. 13/797,848, filed Mar. 12, 2013, Boardman et al.

(Continued)

*Primary Examiner* — Ehud Gartenberg
*Assistant Examiner* — Jared W Pike
(74) *Attorney, Agent, or Firm* — Fletcher Yoder, P.C.

(57) ABSTRACT

A system includes a combustor cap assembly for a multi-tube fuel nozzle. The combustor cap assembly includes a support structure defining an interior volume configured to receive an air flow, a plurality of mixing tubes disposed within the interior volume, wherein each of the plurality of mixing tubes comprises a respective fuel injector and is individually removable from the combustor cap assembly, an air distributor disposed within the interior volume and configured to distribute the air flow received by the interior volume to each of the plurality of mixing tubes, and a combustor cap removably coupled to the support structure.

17 Claims, 6 Drawing Sheets

(56) References Cited

U.S. PATENT DOCUMENTS

| | | |
|---|---|---|
| 5,515,680 A | 5/1996 | Fujimura et al. |
| 5,611,196 A | 3/1997 | Wilson |
| 5,675,971 A | 10/1997 | Angel et al. |
| 5,778,676 A | 7/1998 | Joshi et al. |
| 5,816,049 A | 10/1998 | Joshi |
| 5,822,992 A | 10/1998 | Dean |
| 5,901,555 A | 5/1999 | Mandai et al. |
| 5,927,076 A | 7/1999 | Pillsbury |
| 5,943,866 A | 8/1999 | Lovett et al. |
| 6,016,658 A | 1/2000 | Willis et al. |
| 6,026,645 A | 2/2000 | Stokes et al. |
| 6,038,861 A | 3/2000 | Amos et al. |
| 6,092,363 A | 7/2000 | Ryan |
| 6,164,055 A | 12/2000 | Lovett et al. |
| 6,334,309 B1 | 1/2002 | Dean et al. |
| 6,351,948 B1 | 3/2002 | Goeddeke |
| 6,360,776 B1 | 3/2002 | McCormick et al. |
| 6,363,724 B1 | 4/2002 | Bechtel et al. |
| 6,438,959 B1 | 8/2002 | Dean et al. |
| 6,438,961 B2 | 8/2002 | Tuthill et al. |
| 6,530,222 B2 | 3/2003 | Stuttaford et al. |
| 6,532,742 B2 | 3/2003 | Scarinci et al. |
| 6,705,087 B1 | 3/2004 | Ohri et al. |
| 6,832,483 B2 | 12/2004 | Moriya et al. |
| 6,880,340 B2 * | 4/2005 | Saitoh ............... F23D 14/70 60/737 |
| 6,928,823 B2 | 8/2005 | Inoue et al. |
| 6,983,600 B1 | 1/2006 | Dinu et al. |
| 7,007,478 B2 | 3/2006 | Dinu |
| 7,007,486 B2 | 3/2006 | Sprouse et al. |
| 7,021,562 B2 | 4/2006 | Mansour et al. |
| 7,134,287 B2 | 11/2006 | Belsom et al. |
| 7,171,813 B2 | 2/2007 | Tanaka et al. |
| 7,181,916 B2 | 2/2007 | Ziminsky et al. |
| 7,469,544 B2 | 12/2008 | Farhangi |
| 7,578,130 B1 | 8/2009 | Kraemer et al. |
| 7,617,682 B2 | 11/2009 | Bruck |
| 7,841,182 B2 * | 11/2010 | Martin ............... F02C 3/14 138/39 |
| 7,900,456 B2 | 3/2011 | Mao |
| 8,042,339 B2 | 10/2011 | Lacy et al. |
| 8,065,880 B2 | 11/2011 | Ishizaka et al. |
| 8,079,218 B2 | 12/2011 | Widener |
| 8,104,291 B2 | 1/2012 | Myers et al. |
| 8,122,721 B2 | 2/2012 | Johnson et al. |
| 8,205,452 B2 | 6/2012 | Boardman et al. |
| 8,234,871 B2 | 8/2012 | Davis, Jr. et al. |
| 8,234,872 B2 | 8/2012 | Berry et al. |
| 8,240,151 B2 | 8/2012 | Pelletier et al. |
| 8,266,912 B2 | 9/2012 | Berry et al. |
| 8,276,385 B2 | 10/2012 | Zuo et al. |
| 8,322,143 B2 | 12/2012 | Uhm et al. |
| 8,327,642 B2 | 12/2012 | Uhm et al. |
| 8,408,004 B2 | 4/2013 | Davis, Jr. et al. |
| 8,424,311 B2 | 4/2013 | York et al. |
| 8,474,265 B2 | 7/2013 | Jain et al. |
| 8,484,978 B2 | 7/2013 | Bailey et al. |
| 8,505,304 B2 | 8/2013 | Myers et al. |
| 8,522,555 B2 | 9/2013 | Berry et al. |
| 8,528,334 B2 | 9/2013 | Dutta et al. |
| 8,528,839 B2 | 9/2013 | Bailey et al. |
| 8,572,979 B2 | 11/2013 | Smith et al. |
| 8,616,002 B2 | 12/2013 | Kraemer et al. |
| 8,701,419 B2 | 4/2014 | Hughes |
| 8,789,372 B2 | 7/2014 | Johnson et al. |
| 8,800,289 B2 | 8/2014 | Johnson et al. |
| 8,850,821 B2 | 10/2014 | Khan et al. |
| 8,899,049 B2 | 12/2014 | Krull et al. |
| 8,904,797 B2 | 12/2014 | Berry et al. |
| 8,919,127 B2 | 12/2014 | Melton et al. |
| 8,938,978 B2 | 1/2015 | Bailey et al. |
| 8,966,909 B2 | 3/2015 | Crothers et al. |
| 9,032,704 B2 | 5/2015 | Crothers et al. |
| 9,151,502 B2 | 10/2015 | Crothers et al. |
| 9,163,839 B2 | 10/2015 | Westmoreland et al. |
| 9,200,571 B2 | 12/2015 | Bailey et al. |
| 9,255,711 B2 | 2/2016 | Crothers et al. |
| 2002/0014078 A1 | 2/2002 | Mandai et al. |
| 2002/0119412 A1 | 8/2002 | Loving |
| 2002/0128790 A1 | 9/2002 | Woodmansee |
| 2002/0192615 A1 | 12/2002 | Moriya et al. |
| 2003/0014975 A1 | 1/2003 | Nishida et al. |
| 2003/0037549 A1 | 2/2003 | Mandai et al. |
| 2003/0089801 A1 | 5/2003 | Saitoh et al. |
| 2004/0006990 A1 | 1/2004 | Stuttaford et al. |
| 2004/0006991 A1 | 1/2004 | Stuttaford et al. |
| 2004/0006992 A1 | 1/2004 | Stuttaford et al. |
| 2004/0006993 A1 | 1/2004 | Stuttaford et al. |
| 2004/0060297 A1 | 4/2004 | Koenig et al. |
| 2004/0142294 A1 | 7/2004 | Niass et al. |
| 2004/0163392 A1 | 8/2004 | Nishida et al. |
| 2005/0268617 A1 | 12/2005 | Amond, III et al. |
| 2007/0289305 A1 | 12/2007 | Oda et al. |
| 2008/0053097 A1 | 3/2008 | Han et al. |
| 2008/0078179 A1 | 4/2008 | Cai |
| 2008/0163627 A1 | 7/2008 | ELKady et al. |
| 2009/0188255 A1 * | 7/2009 | Green ............... F01D 9/023 60/737 |
| 2009/0223225 A1 | 9/2009 | Kraemer et al. |
| 2009/0241547 A1 | 10/2009 | Luts et al. |
| 2009/0280443 A1 | 11/2009 | Carroni et al. |
| 2010/0064691 A1 | 3/2010 | Laster et al. |
| 2010/0089065 A1 | 4/2010 | Tuthill |
| 2010/0192579 A1 | 8/2010 | Boardman et al. |
| 2010/0192583 A1 | 8/2010 | Cano Wolff et al. |
| 2010/0192586 A1 | 8/2010 | Terada et al. |
| 2010/0205970 A1 | 8/2010 | Hessler et al. |
| 2010/0218501 A1 | 9/2010 | York et al. |
| 2010/0236247 A1 | 9/2010 | Davis, Jr. et al. |
| 2010/0236252 A1 | 9/2010 | Huth |
| 2010/0242493 A1 * | 9/2010 | Cihlar ............... F23R 3/283 60/796 |
| 2010/0263384 A1 | 10/2010 | Chila |
| 2011/0016866 A1 | 1/2011 | Boardman et al. |
| 2011/0094235 A1 * | 4/2011 | Mulherin ............... F23R 3/04 60/772 |
| 2011/0113783 A1 | 5/2011 | Boardman et al. |
| 2011/0197591 A1 | 8/2011 | Valeev et al. |
| 2011/0209481 A1 | 9/2011 | Simmons |
| 2011/0314823 A1 | 12/2011 | Smith et al. |
| 2012/0047902 A1 | 3/2012 | Tuthill |
| 2012/0055167 A1 | 3/2012 | Johnson et al. |
| 2012/0073302 A1 | 3/2012 | Myers et al. |
| 2012/0180487 A1 | 7/2012 | Uhm et al. |
| 2012/0180488 A1 | 7/2012 | Bailey et al. |
| 2012/0227371 A1 | 9/2012 | Johnson et al. |
| 2012/0297785 A1 | 11/2012 | Melton et al. |
| 2012/0324896 A1 | 12/2012 | Kim et al. |
| 2013/0025285 A1 | 1/2013 | Stewart et al. |
| 2013/0067920 A1 | 3/2013 | Fox et al. |
| 2013/0074503 A1 | 3/2013 | Rohrssen et al. |
| 2013/0086912 A1 | 4/2013 | Berry |
| 2013/0104554 A1 | 5/2013 | Bode et al. |
| 2013/0125549 A1 | 5/2013 | Bailey et al. |
| 2013/0180256 A1 | 7/2013 | Stoia |
| 2013/0232977 A1 | 9/2013 | Siddagangaiah et al. |
| 2013/0232979 A1 | 9/2013 | Singh |
| 2013/0299602 A1 | 11/2013 | Hughes et al. |
| 2014/0033718 A1 | 2/2014 | Manoharan et al. |
| 2014/0033722 A1 | 2/2014 | Abdel-Hafez et al. |
| 2014/0260259 A1 | 9/2014 | Ginesin et al. |
| 2014/0260267 A1 | 9/2014 | Melton et al. |
| 2014/0260268 A1 | 9/2014 | Westmoreland et al. |
| 2014/0260271 A1 | 9/2014 | Keener et al. |
| 2014/0260276 A1 | 9/2014 | Westmoreland et al. |
| 2014/0260299 A1 | 9/2014 | Boardman et al. |
| 2014/0260300 A1 | 9/2014 | Chila et al. |
| 2014/0260315 A1 | 9/2014 | Westmoreland et al. |
| 2014/0283522 A1 | 9/2014 | Boardman et al. |
| 2014/0338338 A1 | 11/2014 | Chila et al. |
| 2014/0338339 A1 | 11/2014 | Westmoreland et al. |
| 2014/0338340 A1 | 11/2014 | Melton et al. |
| 2014/0338344 A1 | 11/2014 | Stewart et al. |
| 2014/0338354 A1 | 11/2014 | Stewart et al. |

(56) References Cited

U.S. PATENT DOCUMENTS

| | | |
|---|---|---|
| 2014/0338355 A1 | 11/2014 | Stewart et al. |
| 2014/0338356 A1 | 11/2014 | Keener et al. |
| 2014/0367495 A1 | 12/2014 | Monaghan et al. |
| 2015/0000285 A1 | 1/2015 | Deiss et al. |
| 2015/0059353 A1 | 3/2015 | Asai et al. |
| 2015/0165568 A1 | 6/2015 | Means et al. |
| 2016/0060154 A1 | 3/2016 | Cowles et al. |

OTHER PUBLICATIONS

U.S. Appl. No. 13/797,859, filed Mar. 12, 2013, Boardman et al.
U.S. Appl. No. 13/797,883, filed Mar. 12, 2013, Melton et al.
U.S. Appl. No. 13/797,896, filed Mar. 12, 2013, Westmoreland et al.
U.S. Appl. No. 13/797,912, filed Mar. 12, 2013, Chila et al.
U.S. Appl. No. 13/797,961, filed Mar. 12, 2013, Westmoreland et al.
U.S. Appl. No. 13/797,986, filed Mar. 12, 2013, Chila et al.
U.S. Appl. No. 13/798,012, filed Mar. 12, 2013, Melton et al.
U.S. Appl. No. 13/798,027, filed Mar. 12, 2013, Westmoreland et al.
U.S. Appl. No. 13/400,248, filed Feb. 20, 2012, Westmoreland et al.
U.S. Appl. No. 13/705,443, filed Dec. 5, 2012, Belsom et al.

\* cited by examiner

MICROMIXING CAP ASSEMBLY

BACKGROUND

The subject matter disclosed herein relates generally to turbine combustors, and, more particularly to a cap for the turbine combustors.

A gas turbine engine combusts a mixture of fuel and air to generate hot combustion gases, which in turn drive one or more turbine stages. In particular, the hot combustion gases force turbine blades to rotate, thereby driving a shaft to rotate one or more loads, e.g., an electrical generator. The gas turbine engine includes a fuel nozzle assembly, e.g., with multiple fuel nozzles, to inject fuel and air into a combustor. The design and construction of the fuel nozzle assembly can significantly affect the mixing and combustion of fuel and air, which in turn can impact exhaust emissions (e.g., nitrogen oxides, carbon monoxide, etc.) and power output of the gas turbine engine. Furthermore, the design and construction of the fuel nozzle assembly can significantly affect the time, cost, and complexity of installation, removal, maintenance, and general servicing. Therefore, it would be desirable to improve the design and construction of the fuel nozzle assembly.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a combustor cap assembly for a multi-tube fuel nozzle. The combustor cap assembly includes a support structure defining an interior volume configured to receive an air flow, a plurality of mixing tubes disposed within the interior volume, wherein each of the plurality of mixing tubes comprises a respective fuel injector and is individually removable from the combustor cap assembly, an air distributor disposed within the interior volume and configured to distribute the air flow received by the interior volume to each of the plurality of mixing tubes, and a combustor cap removably coupled to the support structure.

In a second embodiment, a combustor cap assembly for a multi-tube fuel nozzle includes a support structure defining an interior volume configured to receive an air flow, and an air distributor plate. The air distributor plate includes a plurality of apertures, wherein each of the plurality of apertures is configured to receive one of a plurality of mixing tubes, and a plurality of air passages configured to distribute the air flow to the plurality of mixing tubes.

In a third embodiment, a system includes a combustor cap assembly for a multi-tube fuel nozzle. The combustor cap assembly includes a support structure defining an interior volume, wherein the interior volume is configured to receive an air flow; a plurality of mixing tubes disposed within the interior volume, wherein each of the plurality of mixing tubes is configured to receive the air flow from the interior volume, and each of the plurality of mixing tubes is individually removable from the combustor cap assembly; a plurality of fuel injectors, wherein each of the plurality of fuel injectors is at least partially disposed within a respective one of the plurality of mixing tubes and is configured to inject a fuel flow into the respective one of the mixing tubes; an air distributor disposed within the interior volume, wherein the air distributor comprises a plurality of air passages configured to distribute the air flow within the interior volume to the plurality of mixing tubes; and a combustor cap removably coupled to the support structure.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to a fuel and air premixing system for a gas turbine combustor. For example, the fuel and air premixing system may include a cap assembly, wherein the cap assembly includes a support structure defining an interior volume configured to receive an air flow, a plurality of mixing tubes, an air distributor, and a removable combustor cap. In some embodiments, the cap may be attached to the combustor with a radial spring, and may condition an inlet air flow to improve the quality of premixing air and fuel in the mixing tubes. The presently described system may provide lower manufacturing costs, easier repair procedures, longer equipment lifetime, and/or lower emissions, for example.

Figure 1:
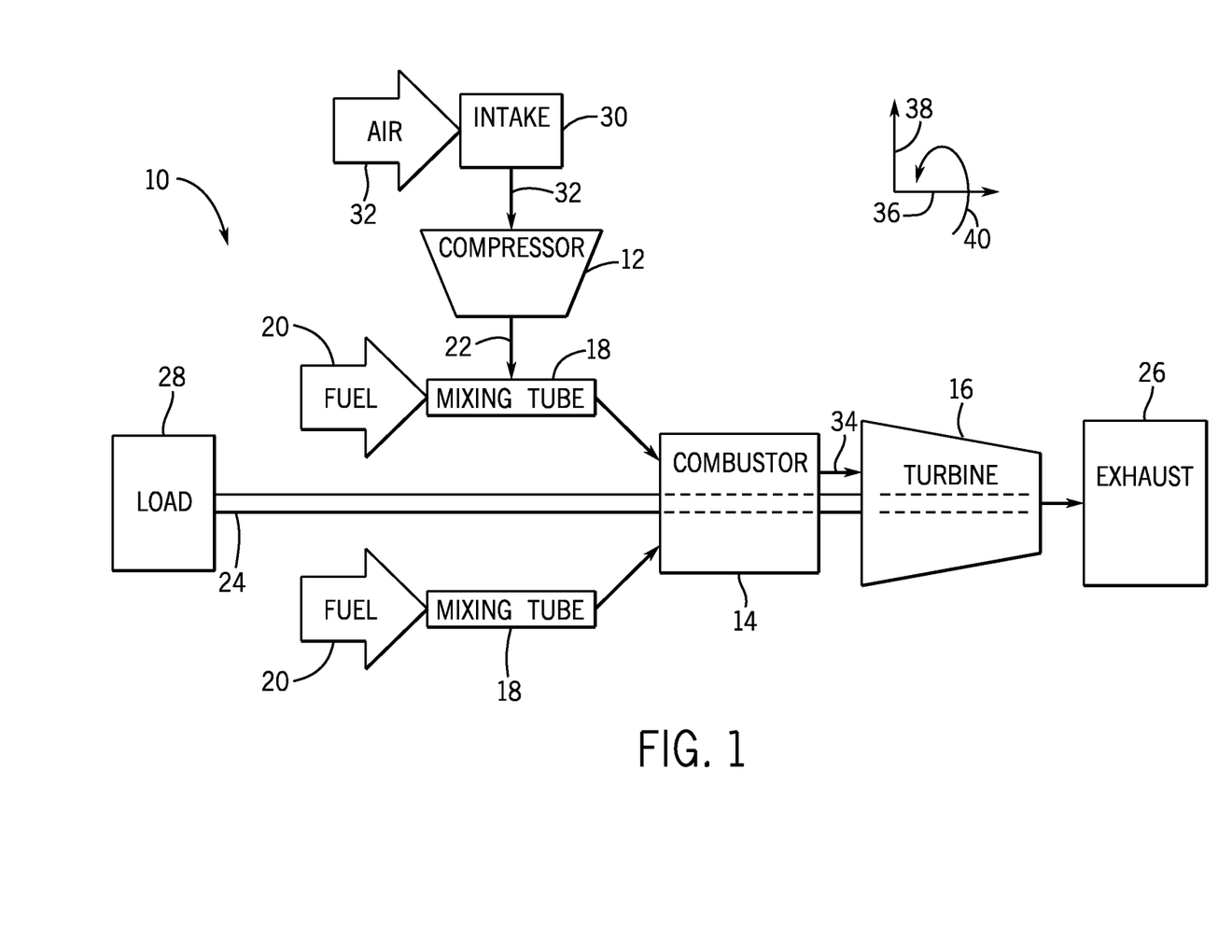
FIG. 1 is a block diagram of an embodiment of a gas turbine system.

Turning to the drawings, FIG. 1 illustrates a block diagram of an embodiment of a gas turbine system 10. As described in detail below, the disclosed turbine system 10 may employ a cap assembly that includes a removable cap face, a retainer plate, and/or a distributor plate. As shown, the system 10 also includes a compressor 12, a turbine combustor 14, and a turbine 16. The turbine combustor 14 may include one or more mixing tubes 18, e.g., in one or more multi-tube fuel nozzles, configured to receive both fuel 20 and pressurized oxidant 22, such as air, oxygen, oxygen-enriched air, oxygen reduced air, or any combination thereof. Although the following discussion refers to the oxidant as the air 22, any suitable oxidant may be used with the disclosed embodiments. The mixing tubes may be described as micromixing tubes, which may have diameters between approximately 0.5 to 2, 0.75 to 1.75, or 1 to 1.5 centimeters. The mixing tubes 18 may be arranged in one or more bundles of closely spaced tubes, generally in a parallel arrangement relative to one another. In this configuration, each mixing tube 18 is configured to mix (e.g., micromix) on a relatively small scale within each mixing tube 18, which then outputs a fuel-air mixture into the combustion chamber. In certain embodiments, the system 10 may include between 10 and 1000 mixing tubes 18, and the system 10 may use a liquid fuel and/or gas fuel 20, such as natural gas or syngas. Furthermore, the combustor 14 may contain the cap assembly noted above and described in more detail in FIG. 2, which may include a removable cap face, a removable retainer plate, and/or a distributor plate. The cap assembly may condition the flow of the pressurized air 22 to improve the uniformity of the distribution to the mixing tubes 18, and may be removed to allow for inspection, maintenance, and/or removal of the mixing tubes 18 and other components of the combustor 14, including the cap assembly itself.

Compressor blades are included as components of the compressor 12. The blades within the compressor 12 are coupled to a shaft 24, and will rotate as the shaft 24 is driven to rotate by the turbine 16, as described below. The rotation of the blades within the compressor 12 compresses air 32 from an air intake 30 into pressurized air 22. The pressurized air 22 is then fed into the mixing tubes 18 of the turbine combustors 14. The pressurized air 22 and fuel 20 are mixed within the mixing tubes 18 to produce a suitable fuel-air mixture ratio for combustion (e.g., a combustion that causes the fuel to more completely burn) so as not to waste fuel 20 or cause excess emissions.

The turbine combustors 14 ignite and combust the fuel-air mixture, and then pass hot pressurized combustion gasses 34 (e.g., exhaust) into the turbine 16. Turbine blades are coupled to the shaft 24, which is also coupled to several other components throughout the turbine system 10. As the combustion gases 34 flow against and between the turbine blades in the turbine 16, the turbine 16 is driven into rotation, which causes the shaft 24 to rotate. Eventually, the combustion gases 34 exit the turbine system 10 via an exhaust outlet 26. Further, the shaft 24 may be coupled to a load 28, which is powered via rotation of the shaft 24. For example, the load 28 may be any suitable device that may generate power via the rotational output of the turbine system 10, such as an electrical generator, a propeller of an airplane, and so forth. In the following discussion, reference may be made to an axial axis or direction 36, a radial axis or direction 38, and/or a circumferential axis or direction 40 of the turbine system 10.

Figure 2:
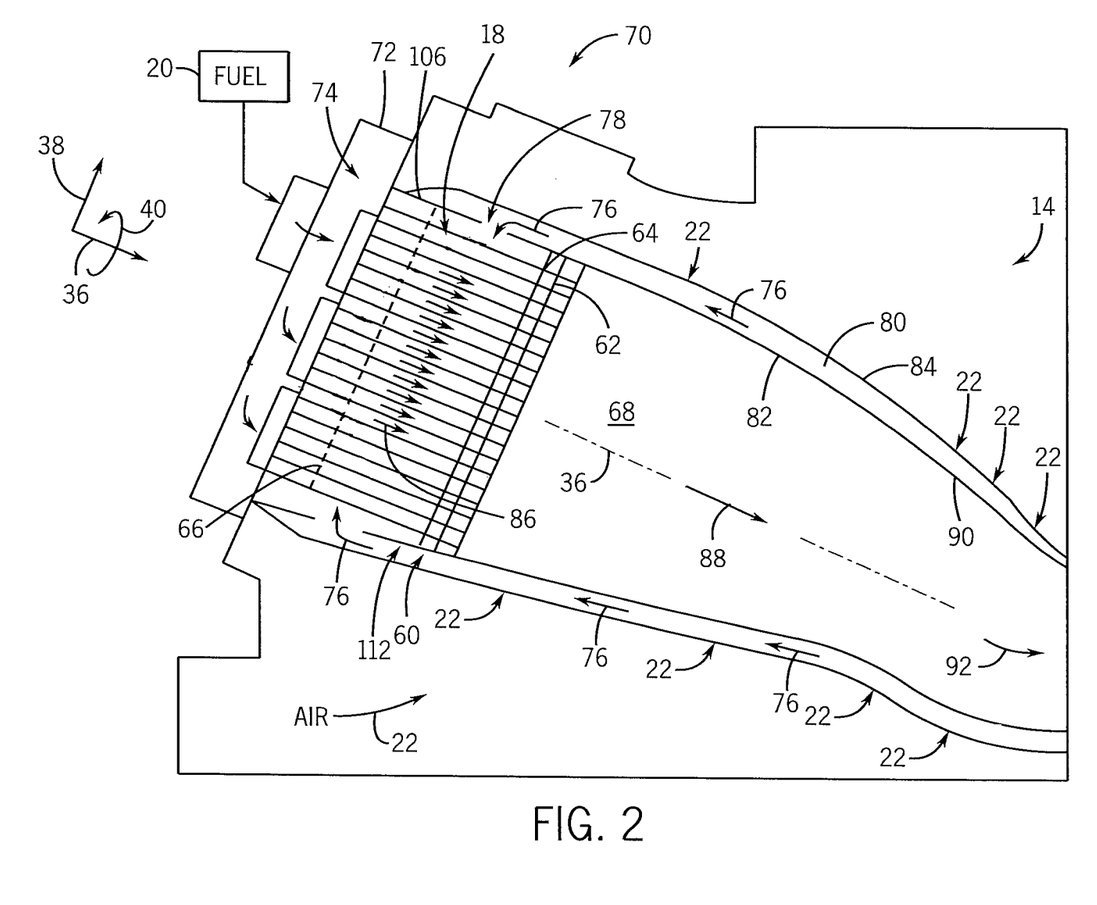
FIG. 2 is a cross-sectional side view of an embodiment of a portion of a turbine combustor of FIG. 1 coupled to a cap assembly of the turbine combustor.

FIG. 2 is a cross-sectional schematic of an embodiment of the combustor 14 of FIG. 1 having a cap assembly 60. The cap assembly 60 includes a removable cap face 62, a retainer plate 64, and an air distributor plate 66. As shown, the combustor 14 further includes a combustion chamber 68 and a head end 70. A plurality of the mixing tubes 18 are positioned within the head end 70 of the combustor 14. The mixing tubes 18 may generally extend between the cap face 62 and an end cover 72 and may extend in the axial direction 36. In some embodiments, the mixing tubes 18 are suspended in the head end 70 such that the mixing tubes 18 may not be attached to the end cover 72 or the cap face 62. Alternatively, however, the mixing tubes 18 may be coupled to at least one of the cap face 62 and/or the end cover 72, as further described below. In addition, the mixing tubes 18 may pass through the air distributor plate 66, which may provide structural and vibrational damping support to the mixing tubes 18. As such, the distributor plate may have apertures that correspond to mixing tubes 18, such that the mixing tubes 18 may extend through the distribution plate 66. The distribution plate 66 may be removably coupled to a support structure 106, which may be a barrel shaped structure that extends circumferentially about the mixing tubes 18, the retainer plate 64, the air distributor plate 66, and other components of the combustor 14. The end cover 72 may also include a fuel plenum 74 for providing fuel 20 to the mixing tubes 18. The fuel plenum 74 routes fuel to the mixing tubes 18 in the axial direction 36, whereas the mixing tubes 18 receive air in the radial direction 38. The cap face 62 may be removably coupled to the head end 70 of the combustor 14 (e.g., with a radial spring or with fasteners such as bolts) so that it may be detached from the support structure 106. Furthermore, the retainer plate 64 may be coupled to the support structure 106 upstream of the cap face 62. Like the cap face 62, the retainer plate 64 may be removably coupled (e.g., bolted, threaded, etc.) to the support structure 106 such that it may be removed to allow for inspection, maintenance, and/or removal of the mixing tubes 18 and other components of the head end 70. As described in more detail below, the retainer plate 64 may provide additional support for a second end 112 of the mixing tubes 18. As mentioned above, one or more components of the cap assembly 60 may be removed from the support structure 106 in order to enable inspection, maintenance, and/or removal of the components of the cap assembly 60 as well as various components of the combustor 14, including the mixing tubes 18.

As described above, the compressor 12 receives air 32 from the air intake 30, compresses the air 32, and produces the flow of pressurized air 22 for use in the combustion process. As shown by arrow 76, the pressurized air 22 is provided to the head end 70 of the combustor 14 through an air inlet 78, which directs the air laterally or radially 38 inward towards side walls of the mixing tubes 18. More specifically, the pressurized air 22 flows in the direction indicated by arrow 76 from the compressor 12 through an annulus 80 between a liner 82 and a flow sleeve 84 of the combustor 14 to reach the head end 70. The liner 82 is positioned circumferentially about combustion chamber 68, the annulus 80 is positioned circumferentially about liner 82, and the flow sleeve 84 is positioned circumferentially about the annulus 80. Upon reaching the head end 70, the air 22 turns from the axial direction 36 to the radial direction 38 through the inlet 78 toward the mixing tubes 18, as indicated by arrows 76.

The pressurized air 22 passes through the distributor plate 66, enters each of the mixing tubes 18 through one or more openings, and is mixed with the fuel 20 within the plurality of mixing tubes 18. As will be appreciated, the air distributor plate 66 may increase the uniformity of the air 22 passing into the mixing tubes 18. Each mixing tube 18 receives the fuel 20 in the axial direction 36 through an axial end portion of the mixing tube 18, while also receiving the air 22 through a plurality of side openings in the mixing tube 18. Thus, the fuel 20 and the air 22 mix within each individual mixing tube 18. As shown by arrows 86, the fuel-air mixture flows downstream within the mixing tubes 18 into the combustion chamber 68, where the fuel-air mixture is ignited and combusted to form the combustion gases 34 (e.g., exhaust). The combustion gases 34 flow in a direction 88 toward a transition piece 90 of the turbine combustor 14. The combustion gases 34 pass through the transition piece 90, as indicated by arrow 92, toward the turbine 16, where the combustion gases 34 drive the rotation of the blades within the turbine 16.

The cap assembly 60, including the cap face 62, the retainer plate 64, and/or the air distributor plate 66, may be configured to be removed to enable inspection, maintenance, and/or removal of components of the combustor 14, including the mixing tubes 18. In addition, the air distributor plate 66 may improve the uniformity of air 22 flow to the mixing tubes 18, which may increase the efficiency of combustion and reduce emissions (NOx) of the turbine system 10. The cap assembly 60 may therefore extend the life cycle of the combustor 14 and reduce its lifetime costs.

Figure 3:
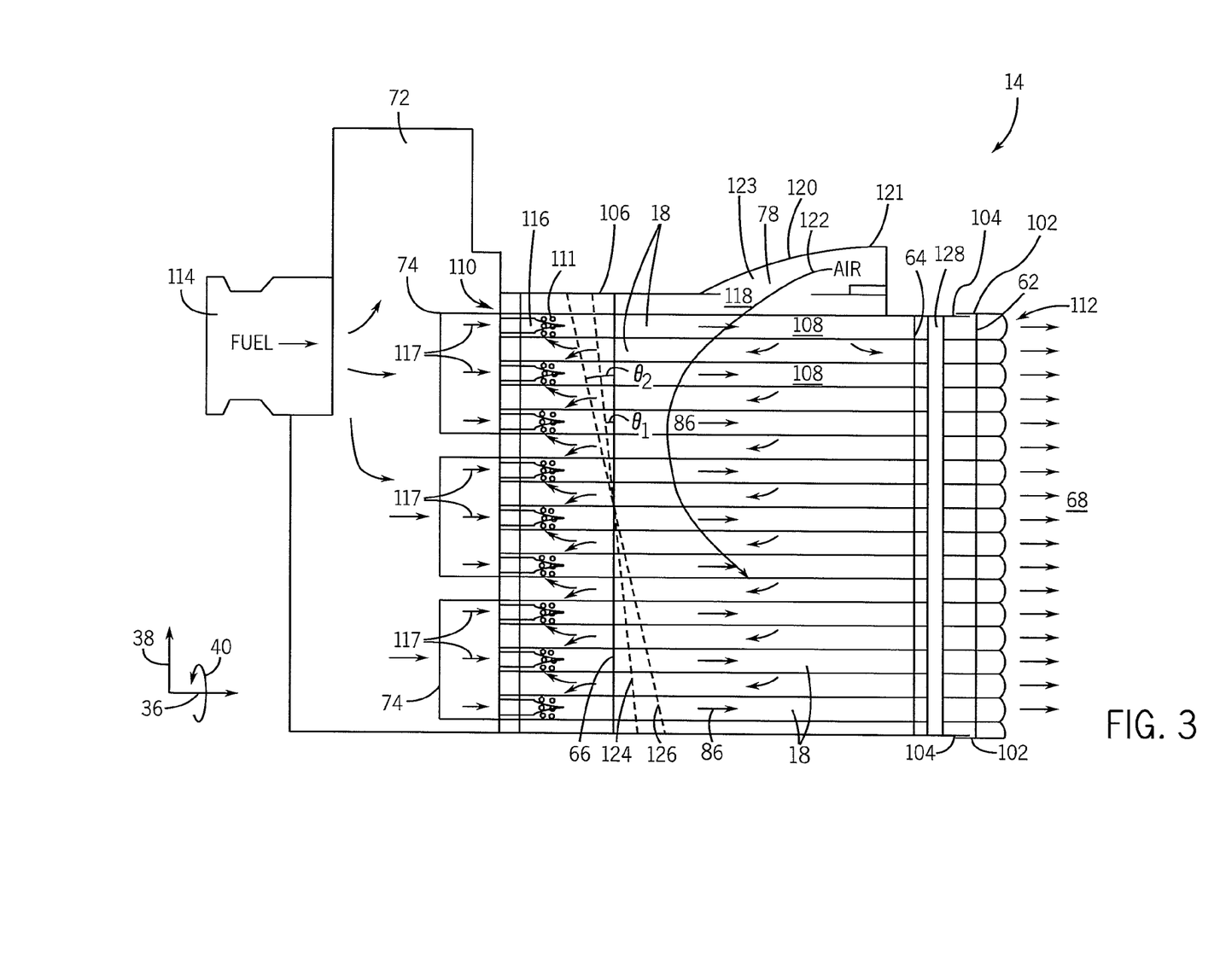
FIG. 3 is a cross-sectional side view of an embodiment of a portion of the turbine combustor of FIG. 2, illustrating the cap assembly.

FIG. 3 is a cross-sectional side view of a portion of the plurality of mixing tubes 18 and the cap assembly 60 within the combustor 14. As described above, the cap assembly 60 includes the cap face 62, the retainer plate 64, and the distributor plate 66. The cap face 62 includes a lip 102, which extends in an upstream direction from the outer edge of the cap face 62. This lip 102 is configured to fit over a radial spring 104, located on the support structure 106. The lip 102 and the radial spring 104 are configured to have similar radii (for example, the radius of the lip 102 may be the same or slightly smaller than the radius of the radial spring 104) such that the lip 102 may be fitted over the radial spring 104 to form a compression or spring-biased fit. The radial spring 104 may have a radially outward bias, so that it may compress in order to hold the lip 102 and the cap face 62 in place to block fluid leakage between the lip 102 and the radial spring 104.

As shown, each mixing tube 18 has a passage or chamber 108 extending between a first end 110 (e.g., axial end opening) and a second end 112 (e.g., axial end opening) of the mixing tube 18. In some embodiments, the second end 112 of the mixing tube 18 may extend through the cap face 62, so that the fuel-air mixture may be output from the mixing tube 18 into the combustion chamber 68 through an axial end opening generally located at the second end 112 of the mixing tube 18.

In some embodiments, the end cover 72 may be positioned upstream of, and proximate to, the first end 110 of the mixing tube 18. The end cover 72 may include one or more fuel inlets 114 through which the fuel 20 is provided to one or more fuel plenums 74 (e.g., 1, 2, 3, 4, 5, 6, 7, 8, 9, 10, or more) within the end cover 72. Furthermore, each fuel plenum 74 may be fluidly connected to one or more fuel injectors 116 (e.g., 1, 2, 3, 4, 5, 6, 7, 8, 9, 10, or more). As illustrated, each mixing tube 18 includes a respective fuel injector 116, which receives the fuel 20 in the axial direction 36 as indicated by arrows 117. In some embodiments, the end cover 72 may include a single common fuel plenum 74 (e.g., fuel supply chamber) for all of the mixing tubes 18 and associated fuel injectors 116. In other embodiments, the system 10 may include one, two, three, or more fuel plenums 74 that each provides fuel 20 to a subgroup of fuel injectors 116, and ultimately to the mixing tube 18 associated with each fuel injector 116. For example, one fuel plenum 74 may provide fuel to about 5, 10, 50, 100, 500, 1000, or more fuel injectors 116. In some embodiments, the combustor 14 having subgroups of fuel injectors 116 supplied by different fuel plenums 74 may allow one or more subgroups of fuel injectors 116 and corresponding mixing tubes 18 to be run richer or leaner than others, which in turn may allow for more control of the combustion process, for example. Additionally, multiple fuel plenums 74 may enable the use of multiple types of fuel 20 (e.g., at the same time) with the combustor 14.

As shown in FIG. 3, the support structure 106 (e.g., side wall) may circumferentially surround the head end 70 of the combustor 14, and the support structure 106 may generally protect and/or support the mixing tubes 18 and other structures within the head end 70, such as the retainer plate 64 and the distributor plate 66. As described above, in some embodiments, pressurized air 22 may enter the head end 70 through an air inlet 78. More specifically, pressurized air 22 may flow through the air inlet 78 laterally into an air cavity 118 within the head end 70 (e.g., in a generally radial direction 38 as indicated by arrow 122). The air cavity 118 includes the volume of space in between the plurality of mixing tubes 18 and surrounded by the support structure 106 (e.g., outer wall). The pressurized air 22 spreads throughout the air cavity 118 as the pressurized air 22 flows to each of the plurality of mixing tubes 18.

In some embodiments, a flow distributor diffuser 120 (e.g., a baffle, a conduit, or turning vane) may be provided in the combustor 14 to improve distribution of the pressurized air 22 within the head end 70. The diffuser 120 may be an annular flow conditioning diffuser 120 configured to distribute the pressurized air 22 forward, radially 38 inward, and/or externally across the plurality of mixing tubes 18. For example, the diffuser 120 may include a tapered annular wall 121, which gradually angles or curves inwardly toward the cavity 118 and mixing tubes 18 in the radial direction 38. The diffuser 120 also may include an annular internal passage 123, which generally diverges or grows in cross-sectional area toward the cavity 118 and the mixing tubes 18. In some embodiments, the diffuser 120 may diffuse the pressurized air 22 such that the pressurized air 22 is substantially evenly distributed to each mixing tube 18. Furthermore, the perforated air distributor plate 66 may also contribute to the distribution of the pressurized air 22. The air distributor plate 66 may be provided within the cavity 118 of the head end 70, and may generally be positioned between the end cover 72 and the cap face 62. The perforations in the air distribution plate 66 may be of any of a variety of shapes and sizes, and may generally provide additional diffusion and distribution of the pressurized air 22, so as to improve distribution of the pressurized air 22 to the mixing tubes 18. After entering the head end 70 through the air inlet 78, the pressurized air 22 may enter each mixing tube 18 through one or more apertures 111 formed in the mixing tubes 18.

As shown in FIG. 3, in some embodiments, the combustor 14 also has the retainer plate 64 and an impingement plate 128. The retainer plate 64 and the impingement plate 128 may be positioned downstream of the fuel injectors 116 and generally proximate to the cap face 62. The cap face 62, the retainer plate 64, and/or the impingement plate 128 may be removable or separable from the support structure 106, for example. The retainer plate 64 may provide support for the mixing tubes 18, as it may be configured to couple to the downstream end (e.g., the second end 112) of each mixing tube 18. The impingement plate 128 may be positioned substantially adjacent to the cap face 62, and in some embodiments, the impingement plate 128 may be positioned between the retainer plate 64 and the cap face 62. The impingement plate 128 may support the mixing tubes 18, and may additionally or alternatively provide for cooling of the cap face 62 within the combustor 14.

Figure 4:
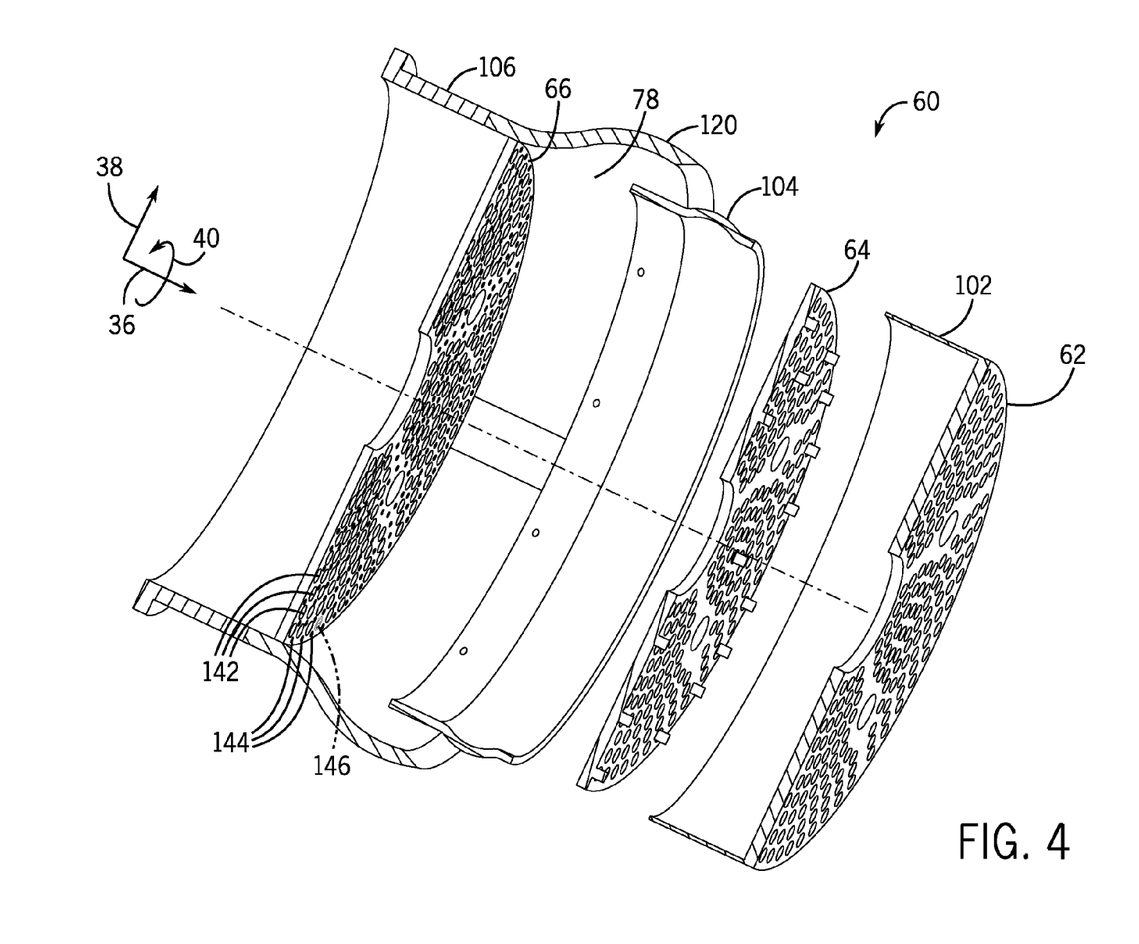
FIG. 4 is an exploded cross-sectional side view of an embodiment of the cap assembly of FIG. 3.

As shown in more detail in FIG. 4, the air distributor plate 66 comprises apertures 142 through which the mixing tubes 18 may extend, as well as air passages 144 around the apertures 142 through which the pressurized air 22 may flow. The air passages 144 may generally provide additional diffusion and distribution of the pressurized air 22 in order to improve the uniformity of the flow of the pressurized air 22 to the mixing tubes 18. For example, the distribution plate 66 may alter the velocity, the pressure, the angle, and/or other qualities of the pressurized air 22 in order to increase the uniformity of the distribution of the air 22 to the mixing tubes 18. As shown, the pressurized air 22 may enter through the diffuser 120 and flow in a direction generally shown by arrow 122 as it flows across the air distributor plate 66 and into/across the mixing tubes 18. The air distributor plate 66 may be perpendicular to the flow of the pressurized air 22 (e.g., may extend along the radial direction 38), or it may be angled across the mixing tubes 18. For example, the air distributor plate 66 may be angled at an angle $\theta_1$, as shown by dashed line 124, or the plate 66 may be angled at an angle $\theta_2$, as shown by dashed line 126, or at any other suitable angle. The dashed lines 124 and 126 depict the air distributor plate 66 angled with respect to the radial direction 38, but it should be understood that the air distributor plate 66 may be angled along any axis of the air distributor plate 66. In addition, the angles $\theta_1$ and $\theta_2$ may be any angle, such as approximately 5, 10, 30, 60, or 80 degrees relative to the radial direction 38, or between 5 and 60, 10 to 45, or 30 to 30 degrees The air distributor plate 66 may be attached to the mixing tubes 18, to the support structure 106, or both, with radial springs (e.g., hula seals), bolts, brazing, or any other suitable method of coupling. In this way, the air distributor plate 66 may provide structural or vibrational damping support to the mixing tubes 18 as it distributes the pressurized air 22 to the mixing tubes 18.

After entering the head end 70 through the air inlet 78, the pressurized air 22 may enter each mixing tube 18 and its respective mixing chamber 108 through one or more apertures 111 formed in the mixing tubes 18. The apertures 111 may be configured to have any of a variety of shapes, sizes, and arrangements. For example, the apertures 111 may be generally circular, elliptical, or rectangular in cross-sectional shape. The apertures 111 may further have a diameter or a dimension in the range of from approximately 0.001 centimeters to approximately 1.5 or more centimeters. The apertures 111 may also have a diameter or dimension in the range of from approximately 0.01 to 1.0, 0.05 to 0.5, or 0.1 to 0.25 centimeters. In some embodiments, one or more rows of apertures 111 may be spaced (e.g., evenly) around the circumference of each of the mixing tubes 18. The apertures 111 formed in the mixing tubes 18 may have substantially similar, or common, shapes, sizes, and/or angles, while in other embodiments the apertures 111 may have different shapes, sizes, and/or angles. In general, the apertures 111 may be positioned at any location along the mixing tube 18. However, in certain embodiments, the apertures 111 may be positioned upstream from the position at which the fuel 20 enters the mixing tube 18 through the fuel injector 116. Furthermore, the apertures 111 may be spaced circumferentially around the fuel injector 116, thereby directing the air radially inward toward the fuel injector 116.

As discussed above and as shown in FIG. 3, one fuel injector 116 is provided for each mixing tube 18 of the combustor 14. In other words, one fuel injector 116 is positioned within a portion of each mixing tube 18 in order to deliver fuel 20 into the respective mixing tube 18. In some embodiments, the fuel injector 116 may be generally coaxially positioned within each mixing tube 18 by inserting the fuel injector 116 axially 36 through the first end 110 of each mixing tube 18. Thus, the mixing tubes 18 may have a size, shape, and configuration to enable each mixing tube 18 to receive the corresponding fuel injector 116. The cap assembly 60, including the removable cap face 62, the removable air distributor plate 66, and/or the removable retainer plate 64, may be removable to enable replacement of individual mixing tubes 18, enable the replacement of the cap face 62 without also replacing the support structure 106, and may improve the air distribution to the mixing tubes 18. As such, the cap assembly 60 may increase the robustness of the gas turbine system 10, thereby reducing the lifecycle cost of the system 10.

FIG. 4 illustrates an exploded cross-sectional side view of the cap assembly 60, including the cap face 62, the air distributor plate 66, and the retainer plate 64. As described above with respect to FIG. 3, the cap face 62 may be removably attached to the support structure 106 via the radial seal 104 (e.g., a hula seal) or some other fasteners (e.g., bolts). The lip 102 of the cap face 62 may be configured to slide over the radial seal 104, which may extend around the circumference of the support structure 106. The radial seal 104 may compress radially inward when the lip 102 is fitted over the seal 104. The seal 104 may be configured to block fluid leakage across an interface between the radial seal 104 and the lip 102, and the seal 104 may removably couple the cap face 62 to the support structure 106. The retainer plate 64 may be removably coupled (e.g., bolted, threaded, etc.) to the support structure 106 upstream of the cap face 62, so that it may be removed to enable inspection, maintenance, and/or removal of the mixing tubes 18. The retainer plate 64 may also provide support for the mixing tubes 18, which may be attached to the retainer plate 64 at their downstream ends 112. The air distributor plate 66 may be a single piece or a multi-piece plate configuration, and the plate 66 may be located upstream of both the cap face 62 and the retainer plate 64. Furthermore, the air distributor plate 66 may be located adjacent to or just upstream of the air diffuser 120 and the air inlet 78. The air distributor plate 66 may help distribute the pressurized air 22 before it enters the mixing tubes 18 through the apertures 111.

As noted above, in some embodiments, the air distributor plate 66 may be angled relative to an axis of each of the plurality of mixing tubes 18 or relative to the support structure 106. Furthermore, the air distributor 66 may include a plurality of apertures 142, which the mixing tubes 18 may be configured to extend through. Surrounding these apertures 142 may be a plurality of air passages 144, through which the pressurized air 22 may flow. The air passages 144 may be small perforations around the apertures 142, or they may be larger cutouts extending along or between the apertures 142. The air passages 144 in the air distributor plate 66 may be of any of a variety of shapes and sizes, and may include venturi or contoured shapes which may reduce unwanted pressure drops as the pressurized air 22 flows across the air distributor plate 66. For example, the air passages 144 may be generally circular, elliptical, polygonal, or rectangular in cross-sectional shape, and may extend between or along mixing tubes 18. The air passages 144 may have a diameter or dimension in the range of from approximately 0.001 centimeters to approximately 1.5 or more centimeters. Furthermore, the air passages 144 may have substantially similar shapes, sizes, and arrangements, or they may have a variety of shapes, sizes, and arrangements. The air passages 144 and/or the apertures 142 may be contoured in order to temporarily restrict the pressurized air 22 as it passes through the air passages 144 in order to increase the velocity of the pressurized air 22 as it flows across the air distributor plate 66.

In some embodiments, at least one aperture 142 may include a radial spring 146, which may be configured to secure the mixing tube 18 which passes through it. The radial spring 146 may be engaged to tighten around the mixing tube 18 as it passes through the aperture 142, and it may provide structural support to the mixing tube 18. Additionally, the radial spring 146 may provide vibrational damping support to the mixing tube 18, and may reduce vibrations, oscillations, or other movements experienced by the mixing tubes 18. In other embodiments, another fastener between the mixing tubes 18 and the air distributor plate 66 may be used to provide structural and vibrational damping support to the mixing tubes 18. The structural and vibrational damping support from the radial springs 146 may increase the robustness of the mixing tube 18. As part of the cap assembly 60, the air distributor plate 66 may increase the reliability and operability of the gas turbine system 10, thereby reducing the life cycle costs of the gas turbine system 10.

As shown, the components of the cap assembly 60 (e.g., the cap face 62, the retainer plate 64, and/or the air distributor plate 66) may each be removed from the support structure 106. This removable cap assembly 60 may allow access to the mixing tubes 18, which may then be inspected, maintained, and/or removed individually. Furthermore, the components of the cap assembly 60 may be removed or replaced independently, and may not require the removal or replacement of other components of the turbine system 10, such as the support structure 106. The cap assembly 60 provides a more modular, easily replaceable, and serviceable configuration for the combustor 14. Additionally, the cap assembly 60 may increase the robustness of the combustor 14 by increasing the ease of access to the components of the combustor (e.g., the mixing tubes 18) and improving the pressurized air 22 distribution to the mixing tubes 18 via the air distribution plate 66. More uniform pressurized air 22 distribution may increase the efficiency of the mixing of the fuel 20 and pressurized air 22, which may lower the emissions (NOx) of the gas turbine system 10 (e.g., in hot pressurized combustion gasses 34, or exhaust). By increasing the serviceability, operability, and robustness of the combustor 14, the cap assembly 60 may increase the lifespan of the combustor 14 and reduce its operating and maintenance costs.

Figure 5:
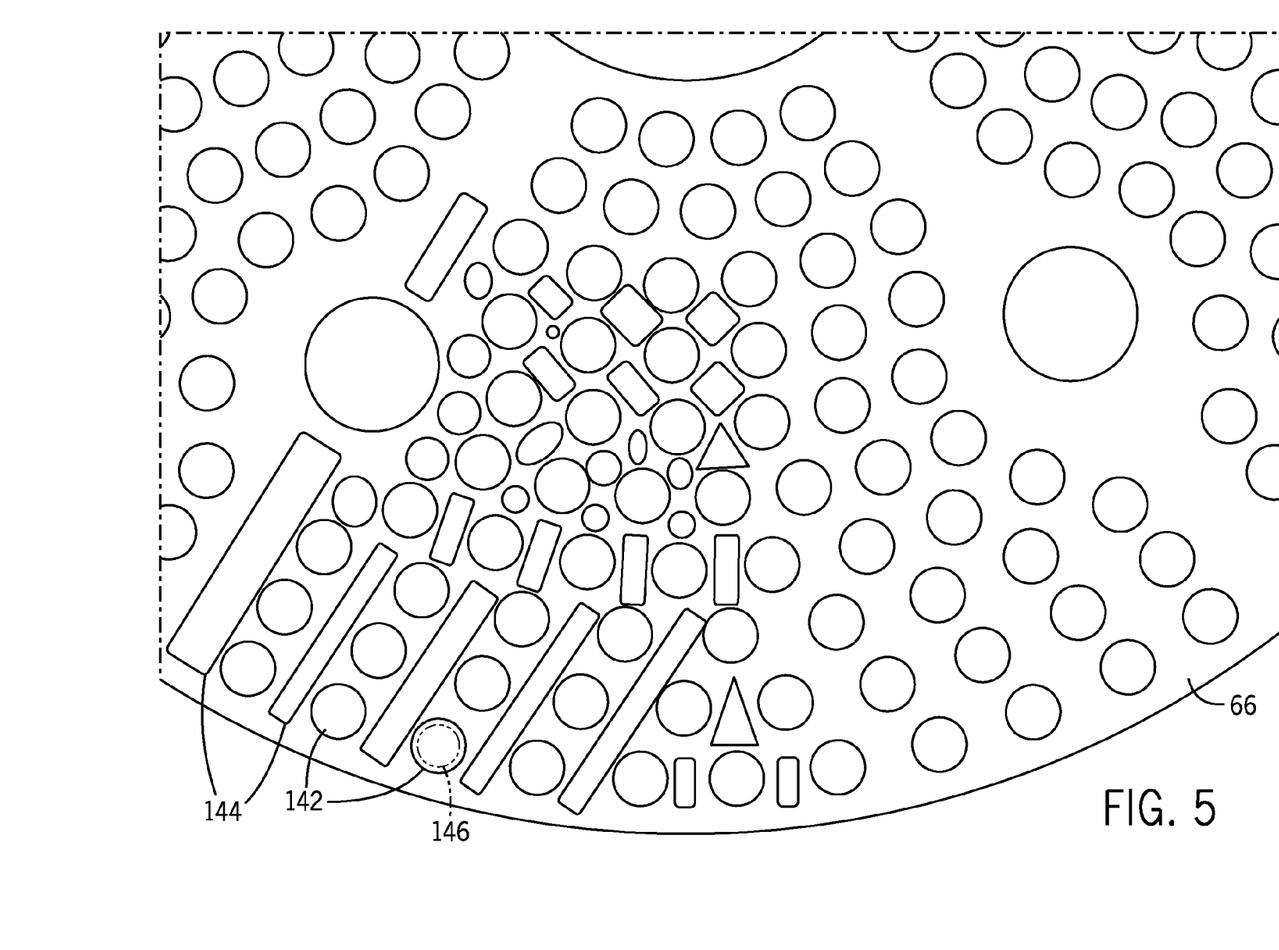
FIG. 5 is an axial view of an embodiment of a portion of a distributor plate.

FIG. 5 shows a partial axial view of the air distributor plate 66, which illustrates the plurality of apertures 142 and air passages 144. The air distributor plate 66 includes the apertures 142 through which the mixing tubes 18 may extend, as well as the air passages 144 configured to improve the pressurized air 22 distribution to the apertures 111 of the mixing tubes 18. As noted above, the air passages 144 may extend along, between, or around the apertures 142, and may have any of a variety of shapes, sizes, and arrangements. For example, the air passages 144 may generally be rectangular, circular, elliptical, polygonal, or triangular in cross-sectional shape, and the air passages 144 may extend along one, two, three, or more of the apertures 142. Additionally, in certain embodiments, the air passages 144 may be fine perforations, as in a wire mesh. The air passages 144 may have a diameter from approximately 0.0001 centimeters to approximately 1.5 or more centimeters. In some embodiments, the air passages 144 may be distributed evenly around the apertures 142, or the air passages 144 may extend along or between one or multiple apertures 142. The air passages 144 may further be contoured to condition the pressurized air 22 to be better distributed by changing the pressure, angle, direction, or other qualities of the pressurized air 22.

Furthermore, as shown in FIG. 5, some apertures 142 may include a radial spring 146 (e.g., a metal spring, a hula seal, a fabric ring, etc.), which may extend around the inner circumference or dimension of the aperture 142. The radial spring 146 may provide structural support and vibrational damping support to the mixing tube 18, which may pass through the aperture 142. Furthermore, the air passages 144 may be contoured or have shapes that may reduce unwanted pressure drops or may condition the pressurized air 22 flow to reduce aft side wakes. The air distributor plate 66 may cause the pressurized air 22 to distribute more evenly to the mixing tubes 18 and may, in spreading and conditioning the air 22, increase the uniformity of the temperature of the pressurized air 22. This may contribute to a more uniform pressurized air-fuel mixture in each mixing tube 18. By altering the flow of the pressurized air 22, the air distributor plate 66 may improve the quality of the air flow to the mixing tubes 18 and/or increase the uniformity of the temperature of the pressurized air 22 as it distributes to the mixing tubes 18.

Figure 6:
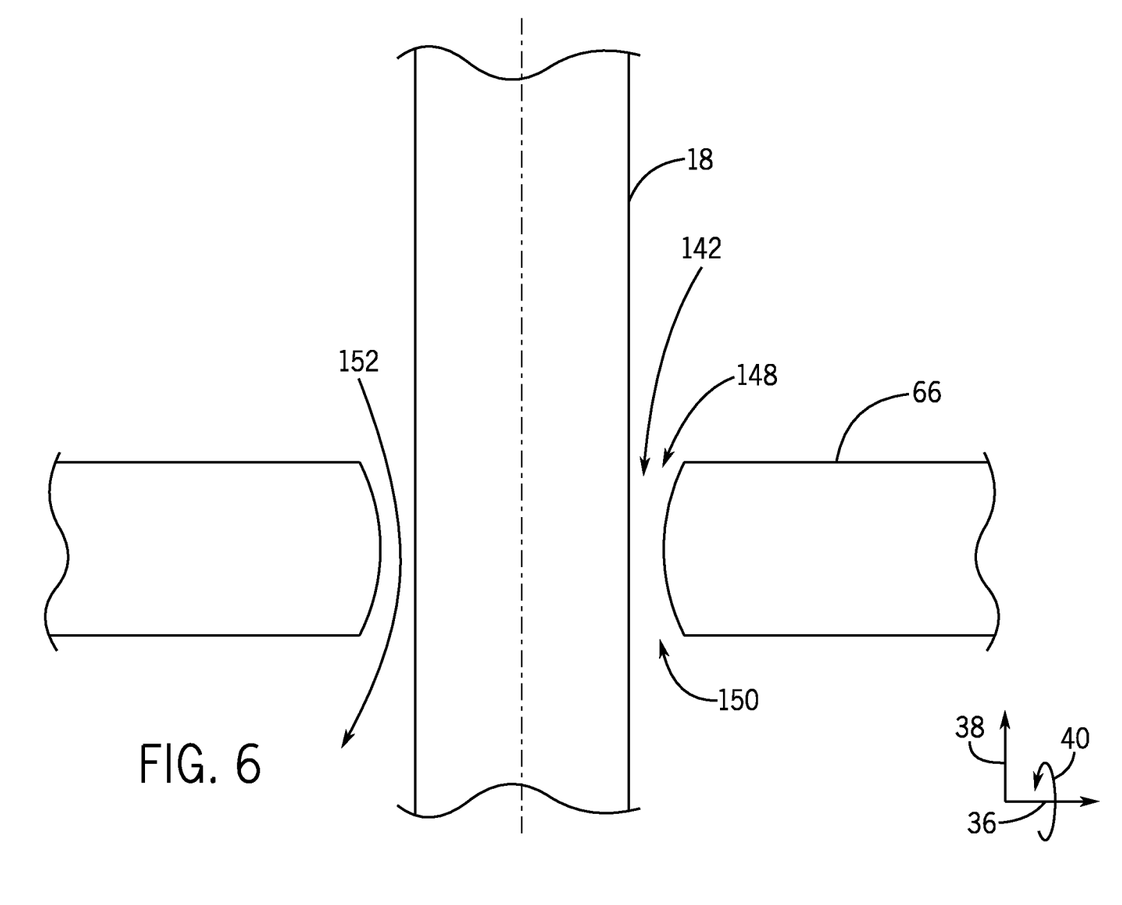
FIG. 6 is a side view of an embodiment of a portion of a mixing tube extending through an aperture in the distributor plate of FIG. 5.

FIG. 6 illustrates a partial view of an embodiment of the air distributor plate 66, having a contoured opening (e.g., aperture 142). As shown in FIG. 6, the mixing tube 18 may pass through the aperture 142 in the air distributor plate 66. The aperture 142 may be configured to temporarily narrow in between an entrance 148 to the aperture 142 and an exit 150 from the aperture 142. For example, the aperture 142 may be configured to have a venturi contouring that includes a converging portion, a throat portion, and a diverging portion. The pressurized air 22 may flow as indicated by arrow 152 through the aperture 142. The temporary narrowing of the aperture 142 in between the entrance 148 and the exit 150 of the aperture 142 may reduce the pressure of the pressurized air 22 passing through the aperture 142 and increase the velocity of the pressurized air 22. In other words, as the pressurized air 22 flows through the aperture 142, it may be constricted by a decrease in the cross-sectional radius or dimensions of the aperture 142. It should be understood that the apertures 142 or the air passages 144 may utilize such contouring in order to condition the flow of the pressurized air 22 as it is distributed to the mixing tubes 18. For example, in the embodiment shown in FIG. 6, the pressurized air 22 may flare away from the mixing tube 18 as it flows through the aperture 142, as indicated by arrow 152. Conditioning with venturi or other contours may increase the velocity of the pressurized air 22 or may otherwise condition the pressurized air 22 as it flows through the aperture 142 to improve the pressurized air 22 distribution. In this manner, temperature uniformity of the pressurized air 22 entering the mixing tubes 18, among other things, may be improved. Improving the pressurized air 22 distribution and increasing temperature uniformity may increase the efficiency of fuel 20 and pressurized air 22 mixing, thereby increasing the efficiency and operability of the gas turbine system 10.

As described above, the disclosed embodiments include the combustor cap assembly 60, which may include the cap face 62, the retainer plate 64, and the air distributor plate 66. For example the cap face 62 may be removably coupled to the support structure 106, and the retainer plate 64 and the air distributor plate 66 may be removably coupled to the plurality of mixing tubes 18 in the head end 70 of the combustor 14. Additionally, the air distributor plate 66 may improve the distribution of pressurized air 22 across the mixing tubes 18, and the cap assembly 60 may be configured to be removable, which may enable maintenance, inspection, and/or removal of other components of the combustor 14.

This written description uses examples to disclose the invention, including the best mode, and also to enables any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
A combustor cap assembly for a multi fuel nozzle, comprising:
a support structure defining an interior volume configured to receive an air flow;
a plurality of mixing tubes disposed within the interior volume, wherein each of the plurality of mixing tubes comprises a respective fuel injector and is individually removable from the combustor cap assembly;
an air distributor disposed within the interior volume, wherein the air distributor is configured to distribute the air flow received by the interior volume to each of the plurality of mixing tubes, wherein the air distributor comprises a plate comprising a plurality of air passages; and
the air distributor is disposed at angle within the interior volume relative to an axis of each mixing tube of the plurality of mixing tubes; and
a combustor cap face removably coupled to the support structure.

2. The system of claim 1, wherein the combustor cap face is removably coupled to the support structure with a radial spring.

3. The system of claim 1, wherein the air distributor comprises a plurality of apertures, wherein each of the plurality of mixing tubes extends through one of the plurality of apertures, and each of the plurality of mixing tubes is individually removable from the air distributor.

4. The system of claim 3, wherein at least one of the plurality of apertures comprises a radial spring that supports one of the plurality of mixing tubes.

5. The system of claim 3, wherein at least one of the plurality of apertures comprises a venturi contour.

6. The system of claim 3, wherein the air distributor comprises a plate coupled to the support structure.

7. The system of claim 1, comprising a retainer plate disposed within the interior volume and removably coupled to the support structure, wherein the retainer plate is configured to at least partially support the plurality of mixing tubes.

8. The system of claim 1, wherein the air distributor comprises a wire mesh.

9. The system of claim 1, wherein the support structure is disposed within a combustion liner.

10. A combustor cap assembly for a multi-tube fuel nozzle, comprising:
a support structure defining an interior volume configured to receive an air flow; and
an air distributor plate, comprising:
a plurality of apertures, wherein each of the plurality of apertures is configured to receive one of a plurality of mixing tubes; and
a plurality of air passages configured to distribute the air flow to the plurality of mixing tubes, wherein the air distributor plate is disposed at an angle within the interior volume relative to an axis of each of the plurality of mixing tubes.

11. The combustor cap assembly of claim 10, wherein each of the plurality of air passages has a common size and shape.

12. The combustor cap assembly of claim 10, wherein at least one of the plurality of air passages extends along at least three of the plurality of apertures.

13. The combustor cap assembly of claim 10, wherein the air distributor plate comprises a multi-piece configuration.

14. The combustor cap assembly of claim 10, wherein at least one of the plurality of air passages comprises a contour configured to reduce a pressure drop across the air distributor plate.

15. A system, comprising:
a combustor cap assembly for a multi-tube fuel nozzle, comprising:
a support structure defining an interior volume, wherein the interior volume is configured to receive an air flow;
a plurality of mixing tubes disposed within the interior volume, wherein each of the plurality of mixing tubes is configured to receive the air flow from the interior volume, and each of the plurality of mixing tubes is individually removable from the combustor cap assembly;
a plurality of fuel injectors, wherein each of the plurality of fuel injectors is at least partially disposed within a respective one of the plurality of mixing tubes and is configured to inject a fuel flow into the respective one of the mixing tubes;
an air distributor disposed within the interior volume, wherein the air distributor comprises a plurality of air passages configured to distribute the air flow within the interior volume to the plurality of mixing tubes, and the air distributor comprises a plate disposed at an angle within the interior volume relative to an axis of each mixing tube of the plurality of mixing tubes; and
a combustor cap face removably coupled to the support structure.

16. The system of claim 15, wherein the plurality of mixing tubes is at least partially supported within the interior volume by the air distributor, and each of the plurality of mixing tubes is individually removable from the air distributor.

17. The system of claim 15, wherien the combustor cap face is coupled to the support structure with a radial spring.

* * * * *